United States Patent
Campbell et al.

(10) Patent No.: US 10,112,637 B2
(45) Date of Patent: Oct. 30, 2018

(54) RETRACTABLE TRAY FOR SHOPPING CART

(71) Applicant: Unarco Industries LLC, Wagoner, OK (US)

(72) Inventors: Christopher Wayne Campbell, Broken Arrow, OK (US); William Timothy Harrison, Muskogee, OK (US); Gregory Eric Dallen, Broken Arrow, OK (US)

(73) Assignee: Unarco Industries LLC, Wagoner, OK (US)

( * ) Notice: Subject to any disclaimer, the term of this patent is extended or adjusted under 35 U.S.C. 154(b) by 0 days.

(21) Appl. No.: 15/725,788

(22) Filed: Oct. 5, 2017

(65) Prior Publication Data
US 2018/0093689 A1    Apr. 5, 2018

Related U.S. Application Data

(60) Provisional application No. 62/404,512, filed on Oct. 5, 2016.

(51) Int. Cl.
*B62B 3/14* (2006.01)

(52) U.S. Cl.
CPC ...... *B62B 3/1468* (2013.01); *B62B 2501/067* (2013.01)

(58) Field of Classification Search
CPC ....... B62B 3/14; B62B 3/1468; B62B 3/1472; B62B 3/18; B62B 3/182; B62B 2501/067; Y10S 280/04
See application file for complete search history.

(56) References Cited

U.S. PATENT DOCUMENTS

| | | | | | |
|---|---|---|---|---|---|
| 5,265,893 | A | * | 11/1993 | Ettlin | B62B 3/18 108/90 |
| 5,385,358 | A | * | 1/1995 | Adamson | B62B 3/148 280/33.995 |
| 6,354,612 | B1 | * | 3/2002 | Adamson | B62B 3/1468 211/126.6 |
| 6,406,041 | B1 | * | 6/2002 | Rea | B62B 3/1468 280/33.992 |

(Continued)

FOREIGN PATENT DOCUMENTS

| | | |
|---|---|---|
| DE | 7626532 U1 | 12/1976 |
| DE | 8206722 U1 | 10/1982 |

(Continued)

OTHER PUBLICATIONS

Jan. 5, 2018—International Search Report and Written Opinion—App PCT/US17/55329.

*Primary Examiner* — Brian L Swenson
(74) *Attorney, Agent, or Firm* — Banner & Witcoff, Ltd.

(57) ABSTRACT

A retractable tray is configured to be mounted on the wall of the basket of a shopping cart and includes a tray member that is moveable between a retracted position, where the tray member is located adjacent the wall of the basket, and an extended position, where the tray extends horizontally from the wall into the basket to form a shelf for supporting produce or other goods above the bottom of the basket. The retractable tray may be configured and dimensioned so as to not interfere with nesting of the cart in either the extended or retracted position.

16 Claims, 9 Drawing Sheets

(56) References Cited

U.S. PATENT DOCUMENTS

| | | | | |
|---|---|---|---|---|
| 6,450,513 B1* | 9/2002 | Bernstein | ............. | B62B 3/1468 |
| | | | | 280/33.991 |
| 8,783,697 B1* | 7/2014 | Wilhite | ................ | B62B 3/1472 |
| | | | | 224/411 |
| 9,802,635 B1* | 10/2017 | White | ................... | B62B 3/1468 |
| 2003/0075888 A1* | 4/2003 | Buckley | ............... | B62B 3/1464 |
| | | | | 280/33.992 |
| 2005/0275177 A1* | 12/2005 | Buckley, III | ......... | B62B 3/1468 |
| | | | | 280/47.34 |
| 2010/0276899 A1* | 11/2010 | Burdwood | ............ | B62B 3/1404 |
| | | | | 280/33.991 |

FOREIGN PATENT DOCUMENTS

| | | |
|---|---|---|
| DE | 19824370 A1 | 12/1999 |
| DE | 102005033031 B3 | 3/2007 |

\* cited by examiner

RETRACTABLE TRAY FOR SHOPPING CART

This application is a non-provisional of, and claims priority to, U.S. Provisional Application No. 62/404,512, filed Oct. 5, 2016, which application is incorporated herein in its entirety.

FIELD OF THE INVENTION

This disclosure relates to nestable shopping carts for grocery stores and the like, and more specifically to a retractable tray installed in such shopping carts that can slide and/or pivot to a retracted position when not in use.

BACKGROUND

History and lore teach that the shopping cart was invented by Oklahoman Sylvan Goldman, for his grocery store business, the one that became over time Unarco Industries, LLC, the assignee of this disclosure. At present, the American-market, adult, full-size, wire-made shopping cart has a distinctive construction of a frame, casters, basket, hinged back gate and child seat. For more historical information, see the following: Unarco Company History, Unarco Industries LLC, currently found at http://www.unarco.com/history.html; and for more allegedly historically accurate information, Shopping Cart, currently found at http://en.wikipedia.org/wiki/Shoppingcart; Smithsonian's History Explorer, History of the Shopping Cart, currently found at http://amhistory.si.edu/thinkfinity/podcast/shoppingcart.m4a. See as well the following patents and patent publications: U.S. Pat. No. 2,155,896, inventor Sylvan Goldman (original shopping cart); U.S. Pat. No. 2,662,775, inventor same; and U.S. Pat. No. 2,769,645, inventor same (folding child seat with hinged back gate). For more current information, see U.S. Pat. No. 7,090,230 issued Aug. 15, 2006, inventor O'Quin, assignee Unarco; U.S. Patent Publication No. US 2014/0159327 published Jun. 12, 2014, on a Shopping Cart, inventors Smith and McMurtrey, assignee Unarco, especially at FIGS. 2-3; U.S. Patent Publication No. US 2013/0307239 published Nov. 21, 2013, on a Shopping Cart and Method of Assembling Same, inventors Smith and McMurtrey, assignee Unarco, especially at its background; and "Manufacturing Shopping Trolleys," https://www.youtube.com/watch?v=u5hwY1sOOOM, uploaded according to YouTube Apr. 12, 2008.

The following pending patent applications are incorporated by reference in full as if fully set forth in this disclosure: U.S. application Ser. No. 14/098,744, filed Dec. 6, 2013, inventors Smith and McMurtrey, assignee Unarco, also known as U.S. Patent Publication No. US 2014/0159327 published Jun. 12, 2014.

Some consumers may desire a location in a shopping cart to store produce or other fragile goods during shopping, in order to prevent such goods from being crushed under cans, bottles, and other heavy, rigid articles that may be in the cart along with the goods. The child seat is often used for this purpose, but this is not an option when the child seat is in use, such as to carry a child, a purse or bag, etc. Existing shopping carts do not provide this functionality. The present disclosure is provided to address this need and other needs in existing shopping carts. A full discussion of the features and advantages of the present invention is deferred to the following detailed description, which proceeds with reference to the accompanying drawings.

BRIEF SUMMARY

A shopping cart in one embodiment includes a retractable tray mounted on the wall of the basket that is moveable between a retracted position, where the tray is located adjacent the wall of the basket, and an extended position, where the tray extends horizontally from the wall into the basket to form a shelf for supporting produce or other goods above the bottom of the basket. The retractable tray may be configured and dimensioned so as to not interfere with nesting of the cart in either the extended or retracted position.

Aspects of the present disclosure relate to a retractable tray that includes a tray member including a supporting surface and having a first end and a second end opposite the first end, a mounting structure configured to be connected to a wall of a shopping cart basket, and a connecting structure connected to the tray member and moveably connected to the mounting structure. The connection between the mounting structure and the connecting structure is configured such that the tray member can move between an extended position and a retracted position. In the extended position, the first end of the tray member is positioned adjacent the mounting structure and the wall of the basket, and the second end of the tray member is extended outwardly from the mounting structure and extends into the shopping cart basket, such that the supporting surface is configured to support an article above a floor of the shopping cart basket. In the retracted position, the tray member is positioned so that both the first end and the second end of the tray member are positioned adjacent the wall of the basket, and the supporting surface is configured to extend along the wall.

According to one aspect, the mounting structure includes a first mount and a second mount spaced horizontally from each other, and the connecting structure includes first and second connecting members connected to the tray member. The first connecting member moveably engaged with the first mount and the second connecting member is moveably engaged with the second mount. In one configuration, the mounting structure further includes a mounting member that forms the first and second mounts and extends between the first and second mounts, where the mounting member is configured for connection to the wall of the shopping cart basket. The mounting member may be formed of a single piece of metal wire extending horizontally along the wall of the shopping cart basket, with the metal wire having first and second projections that are configured to extend inwardly into the shopping cart basket to form the first and second mounts. In another configuration, the first and second mounts are formed as separate structures configured for separate connection to the wall of the shopping cart basket.

According to another aspect, the mounting structure includes a first mount and a second mount, and the connecting structure includes a first elongated track and a second elongated track. The first mount is engaged with the first elongated track and the second mount is engaged with the second elongated track, such that the first and second tracks are configured to slide with respect to the first and second elongated mounts in moving the tray member between the extended position and the retracted position. In one configuration, the first and second elongated tracks each include an elongated passage, where a portion of each of the first and second mounts is received within the elongated passage of the first and second elongated tracks, and these portions of the mounts are configured to slide within the first and second elongated passages in moving the tray member between the extended position and the retracted position. In another configuration, the mounting structure and the connecting structure are configured such that the tray member is moveable from the extended position to the retracted position by pivoting the second end upward and toward the mounting structure from the extended position to reach a partially-retracted position, and then moving the tray member downward from the partially-retracted position while sliding the first and second elongated tracks downward with respect to the first and second mounts to reach the retracted position.

According to a further aspect, the tray member, the mounting structure, and the connecting structure are all formed of metal wire. The connecting structure is welded to the tray member and the mounting structure is be welded to the wall of the shopping cart basket.

Additional aspects of the disclosure relate to a retractable tray that includes a tray member including a supporting surface and having a first end and a second end opposite the first end and two sides extending between the first and second ends, a mounting structure configured to be connected to a wall of a shopping cart basket, and a connecting structure including two elongated tracks connected to the sides of the tray member and extending along the sides. The mounting structure includes two mounts spaced from each other. The tracks of the connecting structure have a proximal end located proximate the first end of the tray member and a distal end located proximate the second end of the tray member, with a length defined between the proximal and distal ends. Each of the elongated tracks is moveably connected to one of the mounts of the mounting structure such that the tray member is moveable by the elongated tracks sliding with respect to the mounts. The tray member is configured to be moveable between an extended position and a retracted position. In the extended position, the first end of the tray member is positioned adjacent the mounting structure and adjacent the wall of the shopping cart basket, and the second end of the tray member is extended horizontally outwardly from the mounts and extends into the shopping cart basket, such that the supporting surface is configured to support an article above a floor of the shopping cart basket. In the retracted position, the tray member is positioned so that both the first end and the second end of the tray member are positioned adjacent the wall of the shopping cart basket, and the supporting surface extends vertically along the wall. The connecting structure is configured such that the mounts traverse the length of each of the elongated tracks in moving between the extended position and the retracted position, such that the mounts are located at the proximal ends of the tracks in the extended position and the mounts are located at the distal ends of the tracks in the retracted position.

According to one aspect, the mounting structure includes a mounting member that forms the mounts and extends between the mounts, and the mounting member is configured for connection to the wall of the shopping cart basket. In one configuration, the mounting member is formed of a single piece of metal wire extending horizontally along the wall of the shopping cart basket, with the metal wire having two projections that extend inwardly into the shopping cart basket to form the mounts.

According to another aspect, the mounts are formed as separate structures configured for separate connection to the wall of the shopping cart basket.

According to a further aspect, the elongated tracks each include an elongated passage extending from the proximal end to the distal end. A portion of each of the mounts is received within the elongated passage of each of the elongated tracks and is configured to slide within the elongated passages in moving the tray member between the extended position and the retracted position.

According to yet another aspect, the mounting structure and the connecting structure are configured such that the tray member is moveable from the extended position to the retracted position by pivoting the second end upward and toward the mounting structure from the extended position to reach a partially-retracted position, and then moving the tray member downward from the partially-retracted position while sliding the elongated tracks downward with respect to the mounts to reach the retracted position.

According to a still further aspect, the tray member, the mounting structure, and the connecting structure are all formed of metal wire. The elongated tracks are welded to the sides of the tray member and the mounts are welded to the wall of the shopping cart basket.

Further aspects of the disclosure relate to a shopping cart or a shopping cart basket that has a retractable tray as described herein connected to the basket. A shopping cart as described herein may include a shopping cart having a basket with a plurality of walls defining a chamber, a frame supporting the basket, and casters connected to the frame. The plurality of walls of the basket include a front wall at a front of the shopping cart, and the retractable tray may be mounted on the front wall of the basket.

According to one aspect, the tray member is positioned within the chamber of the basket in the extended position and the retracted position.

According to another aspect, the shopping cart has a nesting stop configured for abutting a structure on a second identical cart when nested with the second identical cart, such that the nesting stop defines a nesting distance between the shopping cart and the second identical cart when nested. The tray has a length defined between the first and second ends that is smaller than the nesting distance, so that the tray will not interfere with nesting of the carts even in the extended position.

Still further aspects of the disclosure relate to a method of manufacturing and/or installing a retractable tray as described herein. The retractable tray may be manufactured by welding a plurality of metal wires together to form the structures of the tray member, the mounting structure, and the connecting structure. The retractable tray may be installed by connecting the mounting structure to the shopping cart basket and mounting the tray member by connecting the connecting structure to the mounting structure in a moveable configuration.

Other features and advantages of the invention will be apparent from the following description taken in conjunction with the attached drawings.

BRIEF DESCRIPTION OF THE DRAWINGS

To allow for a more full understanding of the present invention, it will now be described by way of example, with reference to the accompanying drawings in which.

DETAILED DESCRIPTION OF EMBODIMENTS

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," "proximal," "distal," and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention, unless explicitly specified by the claims. Further, "providing" an article, as used herein, refers broadly to making an article available or accessible for future actions to be performed on the article, and does not connote that the party providing the article has manufactured, produced, or supplied the article or that the party providing the article has ownership or control of the article.

Figure 1:
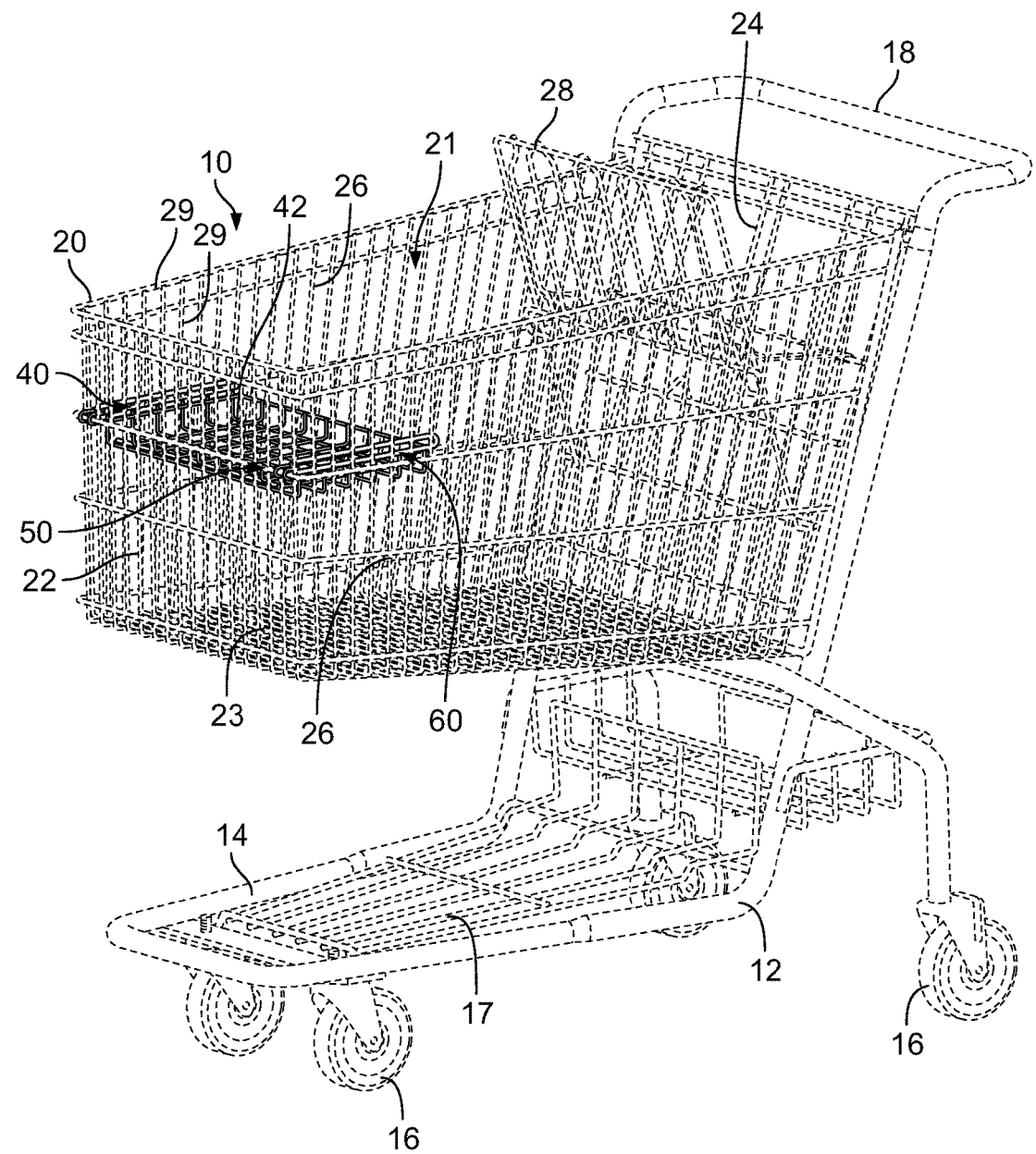
FIG. 1 is a perspective view of a shopping cart according to the prior art, including one embodiment of a retractable tray according to aspects of the present disclosure, with the retractable tray shown in an extended position.

Referring first to FIG. 1, there is shown an example of an American-market, full-size, adult, wire-made shopping cart 10, which is usable in connection with a retractable tray or retractable tray assembly 40 according to aspects of the present disclosure. It is understood that the shopping cart 10 in FIG. 1 is shown by way of example, and the retractable tray 40 may be usable with many other differently configured shopping carts.

The cart 10 includes a frame 12 formed from steel tubing that includes a chassis portion 14, to which casters 16 are mounted, and a handle portion 18. The rear two casters 16 track forward and back, and the front two casters 16 can also swivel. The frame 12 supports a basket 20 that defines a chamber 21 for holding articles, and may also support a lower shelf 17 that can also support articles. The basket 20 includes a front wall 22, a rear wall 24, and side walls 26 extending between the front and rear walls 22, 24, as well as a bottom or floor 23. The rear wall 24 is configured as a swinging real wall or gate, and may further be provided with a collapsible child seat 28. The basket 20 is connected to the chassis portion 14 and the handle portion 18 of the frame 12, by welding or other connection. The basket 20 and the lower shelf 17 are formed by metal wires 29 in the cart 10 illustrated in FIG. 1.

The basket 20 may be formed by a mesh of crossing wires 29 that may be generally horizontal (extending between the sides 26 of the basket 20), generally vertical (extending from the top of the basket 20 toward the surface on which the cart 10 rests), or generally longitudinal (extending between the front 22 and rear 24 of the basket 20). In the configuration shown in FIG. 1, the basket 20 is formed by a first set of wires 29 extending fully from one upper side rail adjacent the handle portion 18, around the sides 26 and front 22 of the basket 20, and to the opposite upper side rail adjacent the handle portion 18. A second set of wires 29 extend from a top wire 29 of the first set, down a side 26 of the basket 20, across the basket floor 23, and up the other side 26. A third set of wires 29 also extend from a top wire 29 of the first set, down the front 22 of the basket 20, and rearward across the floor 23 to the last wire 29 of the second set.

Figure 12:
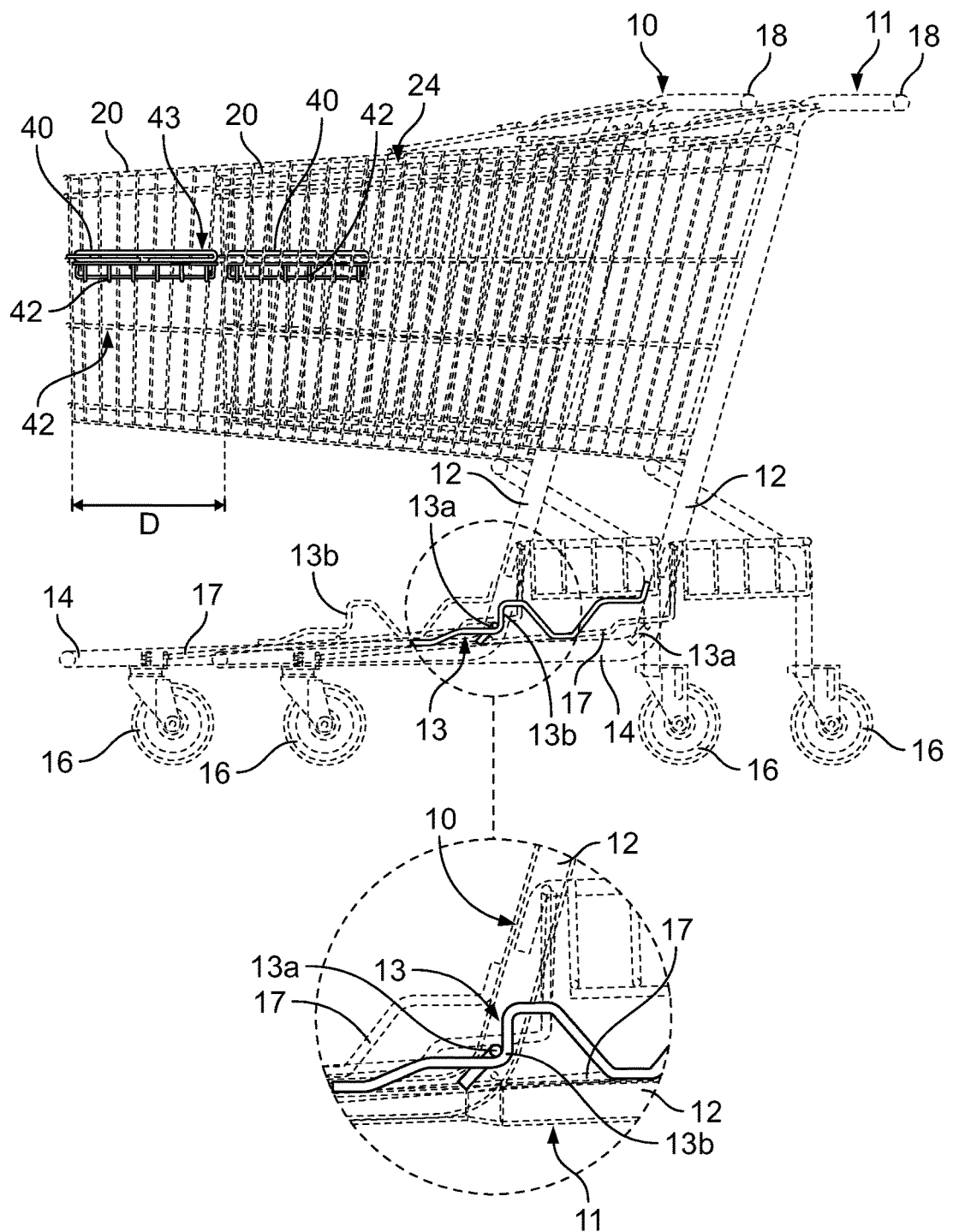
FIG. 12 is a side view of a shopping cart including the retractable tray of FIGS. 2-7 nested inside a second, identical shopping cart.

The cart 10 is configured to be nested with a second cart 11, as shown in FIG. 12, typically identical to the cart 10. In this nesting configuration, the rear wall 24 swings upward as the basket 20 of the second cart 11 is pushed inside the basket 20 of the cart 10. The carts 10, 11 have a nesting stop 13 that serves as a point of contact between the two carts 10, 11, limiting the nesting distance D, i.e., the distance between identical points on the two carts 10, 11, when the carts 10, 11 are fully nested. The cart 10 in the embodiment of FIGS. 1 and 12 has a nesting distance D of approximately 9 inches, and other embodiments of carts may have different (typically greater) nesting distances. In the embodiment of FIGS. 1 and 12, the nesting stop 13 is created by engagement of two structures 13a, 13b located on the chassis portion 14 of the carts 10, 11. It is understood that the nesting stop 13 may be created by different structures in different locations in other carts.

Figure 15:
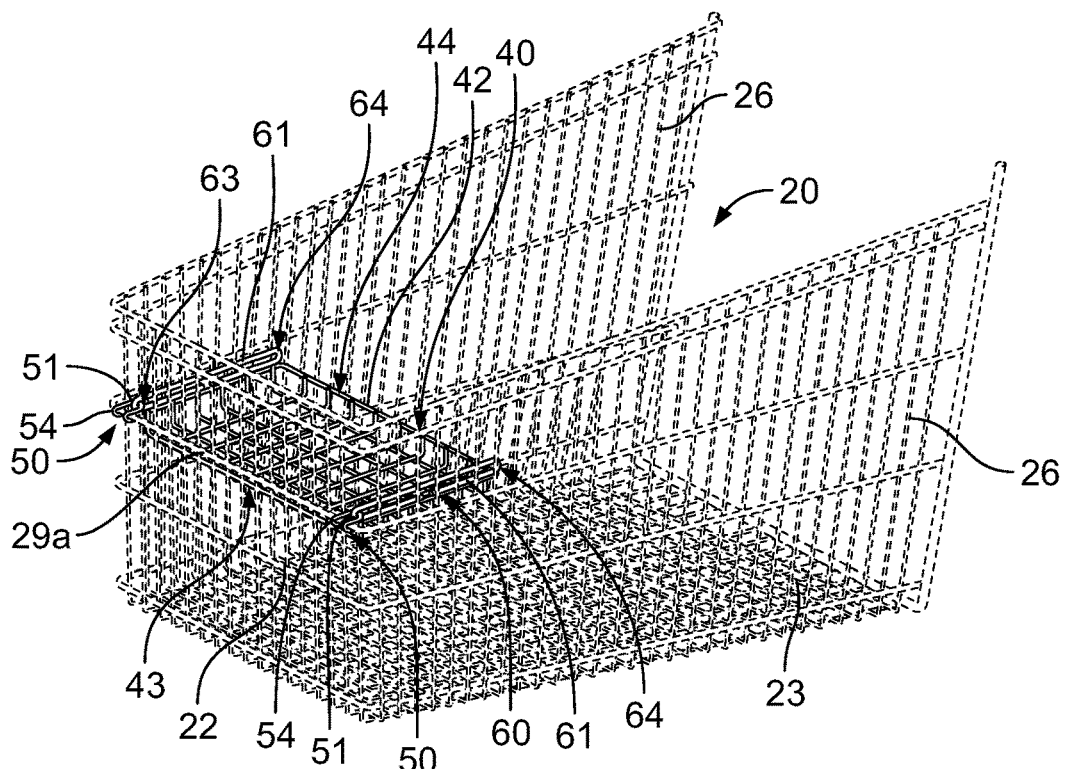
FIG. 15 is a perspective view of a basket and the retractable tray of the shopping cart of FIG. 1 with the retractable tray shown in the extended position.
Figure 16:
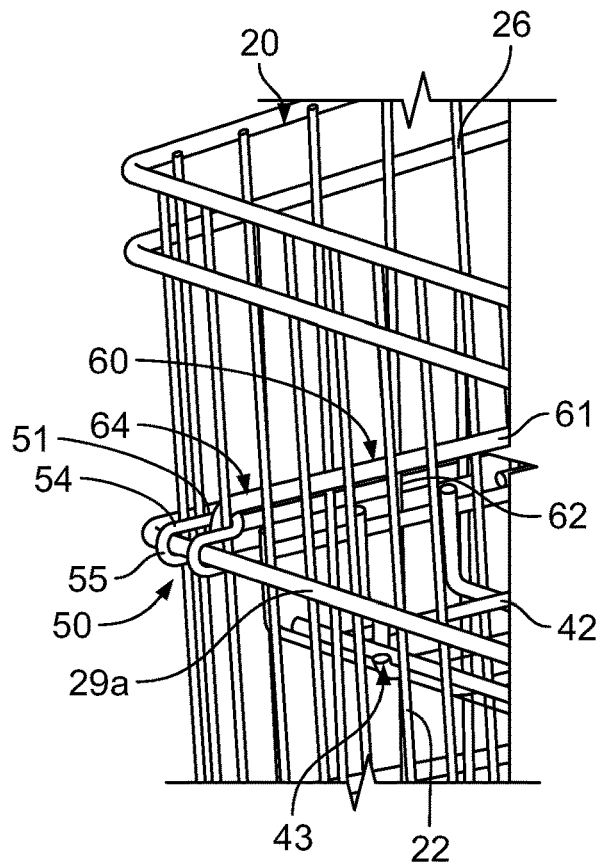
FIG. 16 is a magnified perspective view of the basket of the shopping cart including the retractable tray of FIG. 15, with the retractable tray shown in the extended position.

According to aspects of this disclosure, the cart 10 is provided with a retractable tray or tray assembly 40 that can be extended into the basket 20 to support an article or articles above the floor 23 of the basket 20, such as produce or other fragile articles that may be damaged or crushed by rigid and/or heavy articles located in the basket 20. FIG. 1 illustrates the cart 10 with one embodiment of the tray 40 mounted on the basket 20, and FIGS. 2-7 illustrate the basket 20 alone with another embodiment of the tray 40 mounted on the basket 20. FIGS. 8-11 illustrate the embodiment of the tray 40 in FIGS. 2-7 alone. FIGS. 15-16 illustrate the embodiment of the tray 40 in FIG. 1 mounted on the basket 20. In general, the tray 40 includes a tray member 42 with a supporting surface 41, a mounting structure 50 connected to a wall of the basket 20, and connecting structure 60 connected to the tray member 42 and moveably connected to the mounting structure 50 such that the tray member 42 can move between an extended position and a retracted position. In the extended position, the tray member 42 has a first or proximal end 43 positioned adjacent the wall and a second or distal end 44 extended outwardly from the wall and into the basket 20 such that the supporting surface 41 is generally horizontal and configured to support an article above a floor 23 of the basket 20. The supporting surface 41 may be parallel or generally parallel to the floor 23 of the basket in the extended position. In the retracted position, the tray member 42 is positioned so that both the first end 43 and the second end 44 of the tray member 42 are positioned adjacent the wall and the supporting surface 41 extends generally vertically along the wall. The tray 40 is shown mounted to the front wall 22 of the basket 20 in the embodiments of FIGS. 1-16, but may be mounted elsewhere in other embodiments. At least some of the structures of the tray 40 may be formed by metal wires that are connected together by welding or other technique. In the embodiments of FIGS. 1-16, all or substantially all of the components of the tray 40 are formed of metal wires that are bent and/or connected together to form the various components.

As described above, the tray member 42 in FIGS. 2-12 includes a supporting surface 41 and has a first end 43, a second end 44 opposite the first end 43, and two sides 45 extending between the first and second ends 43, 44. The tray member 42 is configured in a generally rectangular shape in the embodiment of FIGS. 2-12, and in this configuration, the ends 43, 44 and sides 45 are generally linear. The tray member 42 is also configured as a shallow basket in the embodiment of FIGS. 2-12, with side walls 46 extending upward around the supporting surface 41. When the tray member 42 is in the extended position, e.g., as shown in FIGS. 4-5 and 7-11, the tray member 42 may be considered to have a top side 48 that faces upward and an underside 49 that is opposite the top side 48 and faces downward, toward the floor 23 of the basket 20. The tray member 42 is formed entirely of metal wires in the embodiment illustrated, with the supporting surface 41 and the side walls 46 being formed of wire mesh. The tray member 42 may be differently configured in other embodiments, such as having a solid or mesh plastic material forming the supporting surface 41 and the side walls 46 and/or other components.

Figure 7:
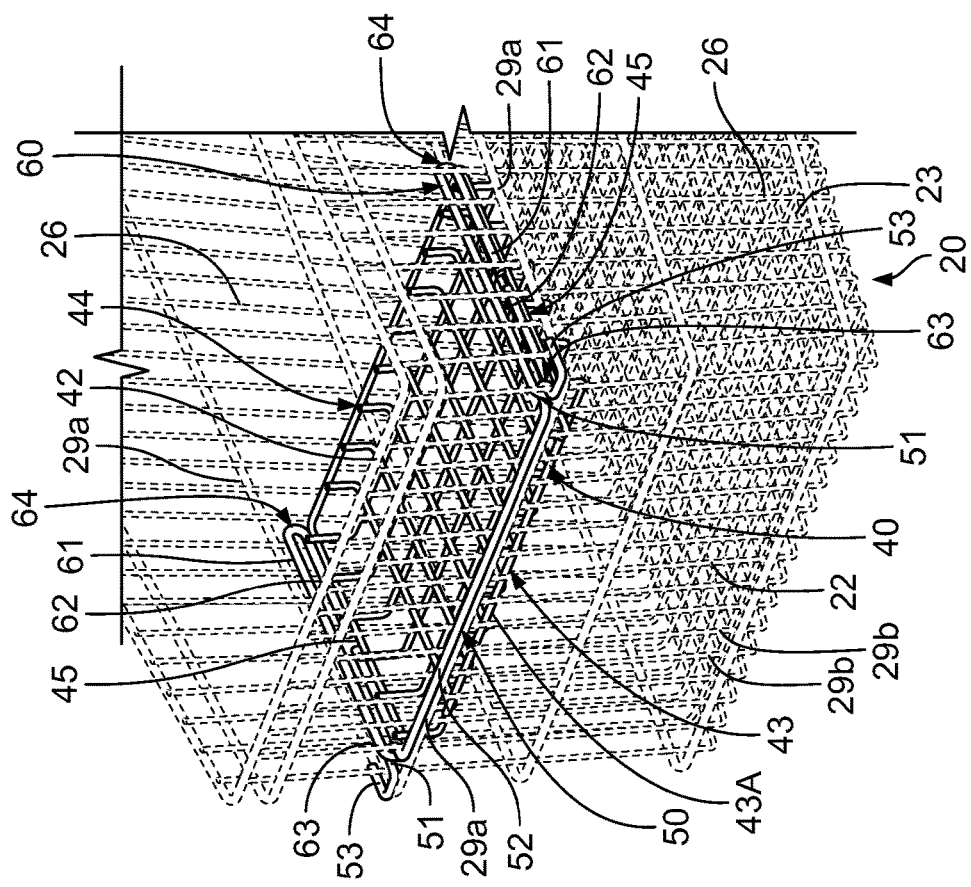
FIG. 7 is a magnified perspective view of a portion of the basket and the retractable tray as shown in FIG. 5.

In general, the mounting structure 50 is connected to a wall of the basket 20 and is configured to moveably mount the tray member 42 to permit the tray member 42 to be moved between the extended and retracted positions. In one example embodiment, the mounting structure 50 includes two mounts 51 spaced apart from each other, each configured for connection to the connecting structure 60 to provide the moveable mounting of the tray member 42. In the embodiment of FIGS. 2-12, the mounting structure 50 is formed by a mounting member 52 that forms both of the mounts 51 and extends between the mounts 51, and which further includes reinforcing members 53 at the ends thereof. The mounting member 52 in the embodiment shown in FIGS. 2-12 is formed of a single wire or beam that is bent to form the mounts 51 in the form of U-shaped partial loops of the wire in a shackle-like configuration, and is further bent to form the reinforcing members 53. As shown most clearly in FIGS. 6-7, the mounting member 52 is mounted on the outside of the basket 20 and extends across the front 22 of the basket 20, and the mounts 51 form projections that extend inward through gaps between the wires 29 to allow mounting of the tray member 42 within the basket 20. The mounting member 52 in this embodiment abuts and extends adjacent to one of the horizontal wires 29a forming the front 22 of the basket 20 and is connected to this adjacent wire 29a, such as by welding or other connection technique. The mounting member 52 in this configuration may additionally or alternately be connected to one or more of the vertical wires 29b forming the front 22 of the basket 20 that are crossed by the mounting member 52. The reinforcing members 53 as shown in FIGS. 6-7 extend to the edges of the front 22 and around the corners to the sides 26 of the basket 20 to connect to wires 29 on the sides 26, thereby more securely connecting the mounting member 52 to the basket 20 and reinforcing the mounting member 52 against torsional forces. For example, the reinforcing members 53 are welded or otherwise connected to the adjacent wire 29a on the corners and/or the sides 26 of the basket 20 in the embodiment of FIGS. 2-7. It is noted that the adjacent wire 29a extends longitudinally along the sides 26. The reinforcing members 53 may additionally or alternately be connected to vertical wires 29b on the corners and/or sides 26. In another embodiment, the mounting member 52 may not include the reinforcing members 53 and may terminate at or near the mounts 51, thus extending at least partially across the front 22 of the basket 20. Further embodiments of mounting structures 50 are shown in FIGS. 13-16 and are described elsewhere herein, and it is understood that the mounting structure 50 may have a configuration not shown in the embodiments illustrated.

The connecting structure 60 is fixedly connected to the tray member 42 and moveably connects the tray member 42 to the mounting structure 50. The connecting structure 60 in one embodiment connects the tray member 42 to the mounting structure 50 in a pivotable manner and in a slidable manner. In the embodiment of FIGS. 2-12, the connecting structure 60 includes two connecting members in the form of elongated tracks 61, each connected to and extending along one of the sides 45 of the tray member 42. The tracks 61 in the illustrated embodiment are each formed by a single wire that is looped to define an elongated passage 62 and is connected (e.g., by welding) to the tray member 42. The tracks 61 are also mounted to be positioned above the tray member 42 when the tray member 42 is in the extended position (e.g., FIG. 7). Each track 61 has two opposed ends 63, 64, which may be referred to as a first or proximal end 63 and a second or distal end 64. In one embodiment, the connecting structure 60 is connected to the mounting structure 50 by having a first connecting member (e.g., track 61) moveably engaged with a first mount 51 and a second connecting member (e.g., track 61) moveably engaged with a second mount 51. The connecting structure 60 in the embodiment of FIGS. 2-12 is connected to the mounting structure 50 by having a portion of each of the mounts 51 received within the passage 62 of the corresponding track 61, allowing the tracks 61 to be pivotable with respect to the mounts 51 and to further be slidable with respect to the mounts 51. In this configuration, the mounts 51 traverse the tracks 61 by sliding between the first and second ends 63, 64 in moving the tray member 42 between the extended and retracted positions. The mounts 51 traverse at least a portion of the lengths of the tracks 61 in moving between the extended and retracted positions, and in the embodiment of FIGS. 2-12, the mounts 51 traverse the entire lengths of the tracks 61 (measured between the first and second ends 63, 64). In other embodiments, the tray 40 may include one or more tracks 61 that are configured and/or located differently, or a different type of connecting structure 60. For example, the connecting structure 60 may be more complicated in another embodiment, such as by including rollers, with complementary structures in the mounting structure 50.

Figure 2:
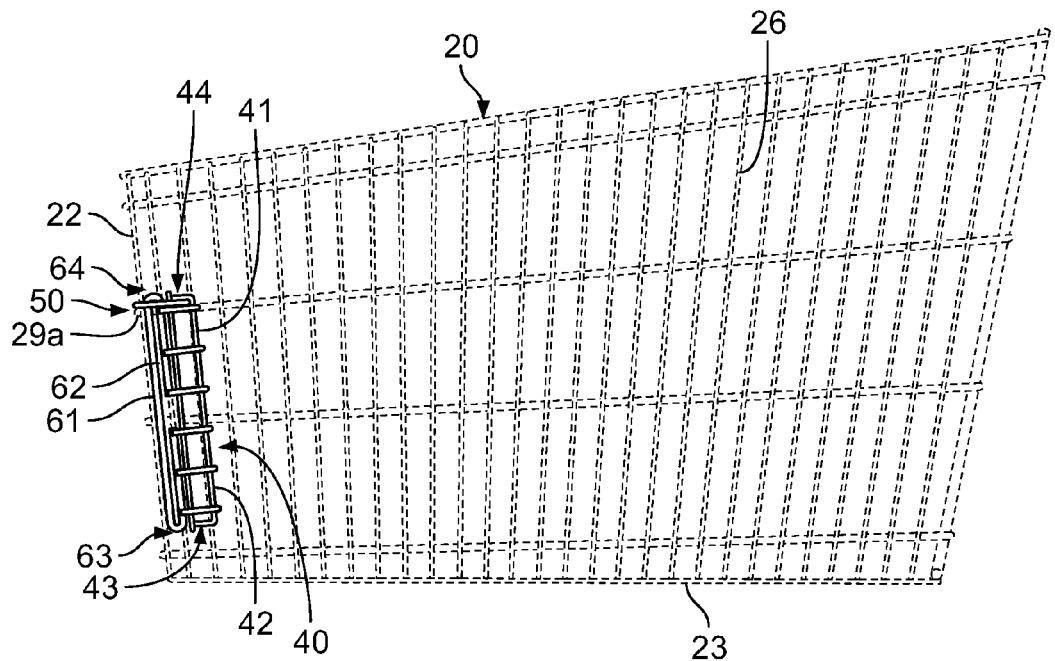
FIG. 2 is a side view of a basket of a shopping cart including another embodiment of a retractable tray according to aspects of the present disclosure, with the retractable tray shown in a retracted position.
Figure 3:
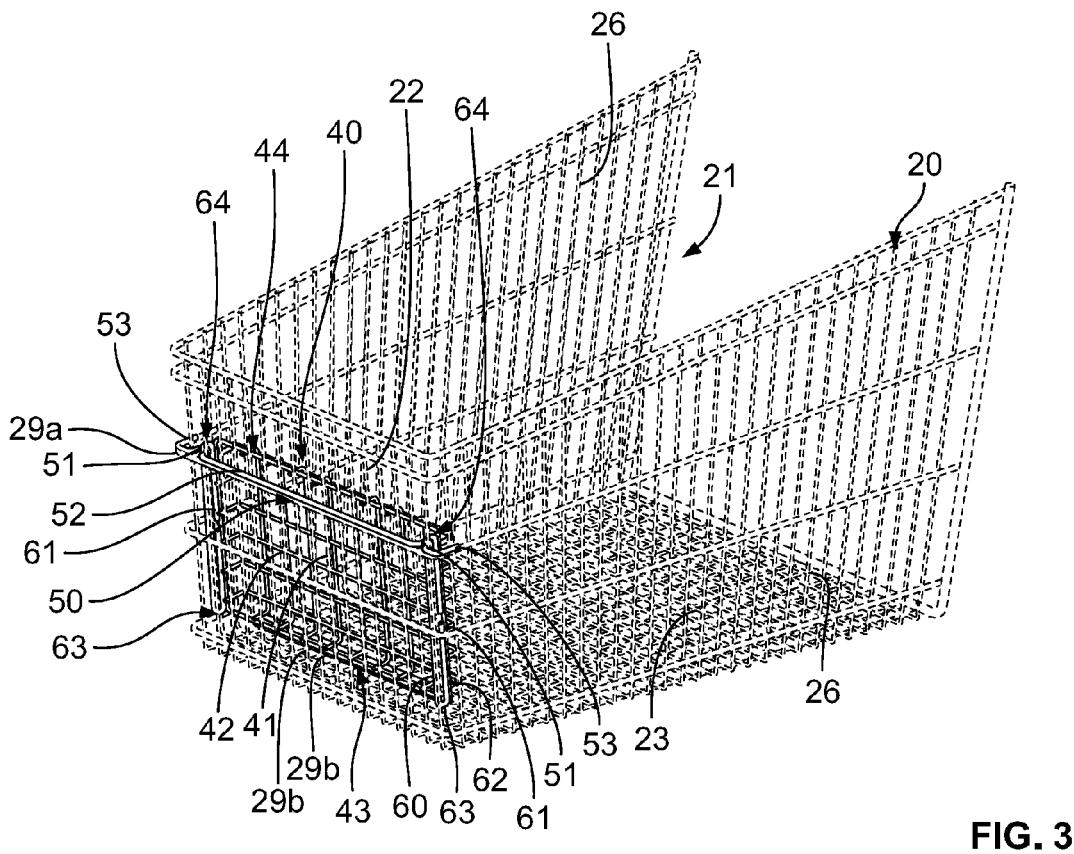
FIG. 3 is a perspective view of the basket of the shopping cart including the retractable tray of FIG. 2, with the retractable tray shown in the retracted position.
Figure 4:
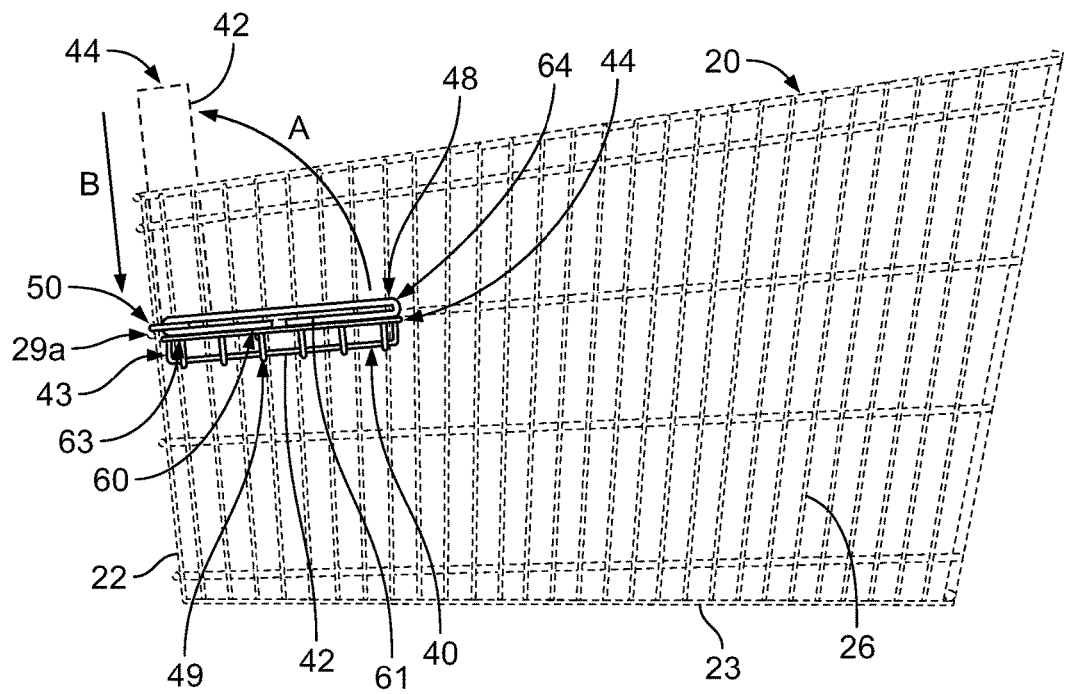
FIG. 4 is a side view of the basket of the shopping cart including the retractable tray of FIG. 2, with the retractable tray shown in an extended position, schematically illustrating movement of the tray to the retracted position.
Figure 5:
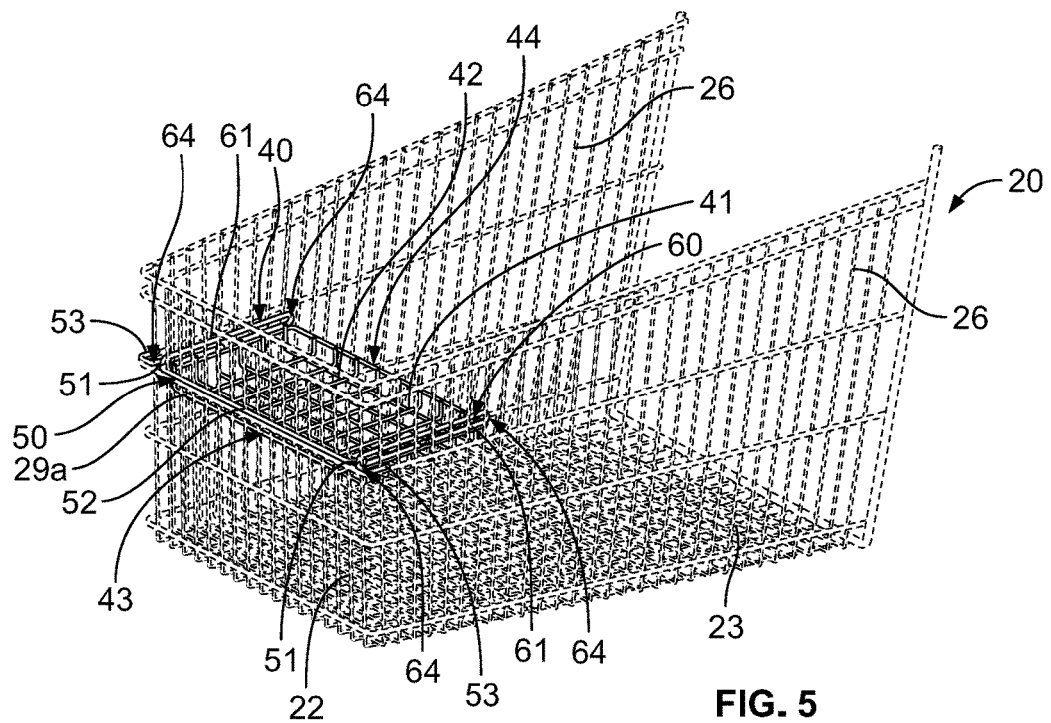
FIG. 5 is a perspective view of the basket of the shopping cart including the retractable tray of FIG. 2, with the retractable tray shown in the extended position.
Figure 6:
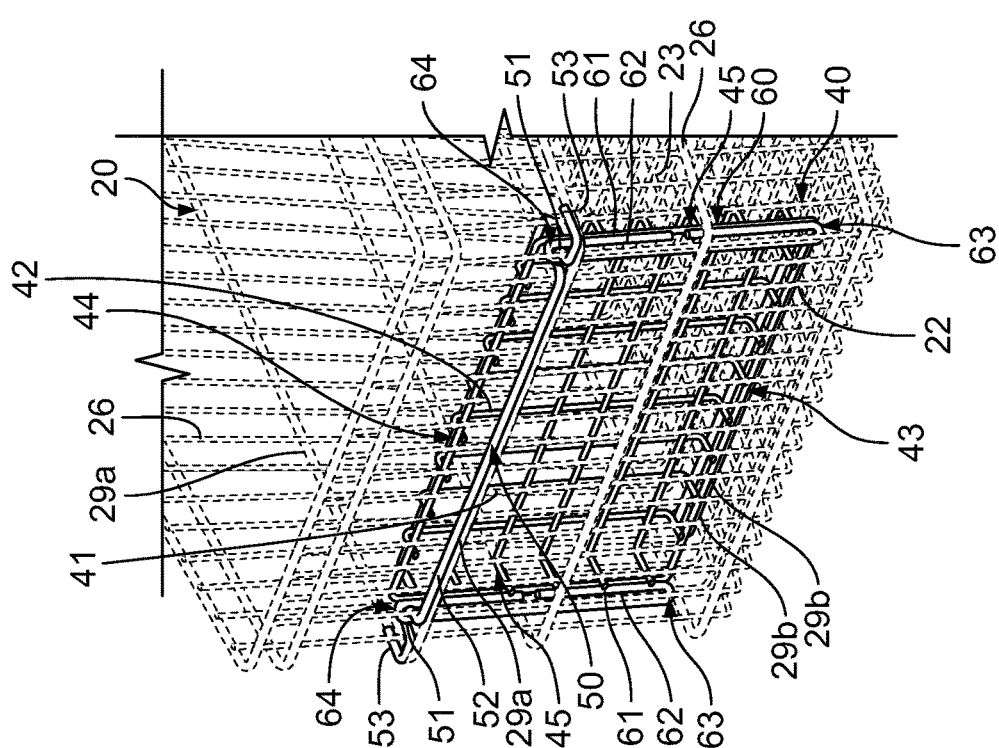
FIG. 6 is a magnified perspective view of a portion of the basket and the retractable tray as shown in FIG. 3.
Figure 8:
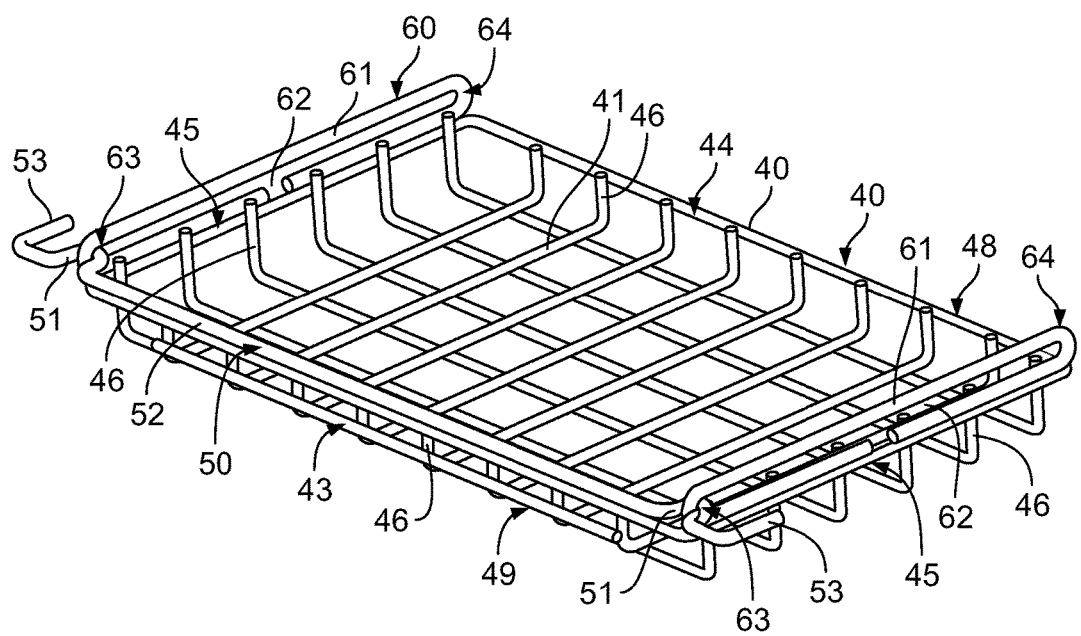
FIG. 8 is a perspective view of the retractable tray of FIGS. 2-7.
Figure 9:
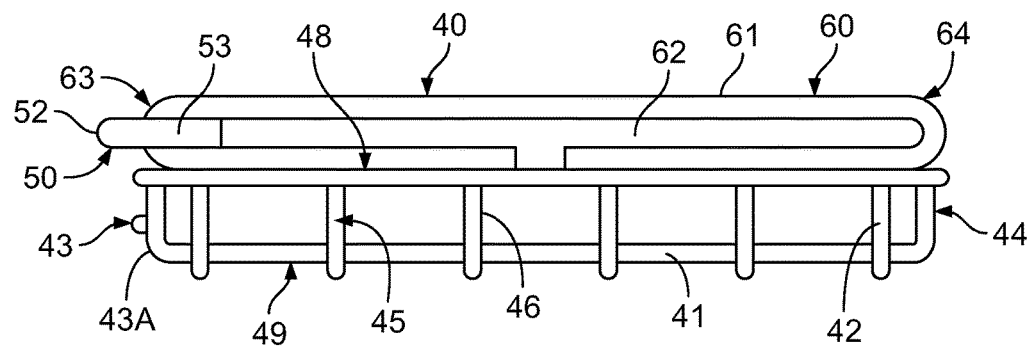
FIG. 9 is a side view of the retractable tray of FIGS. 2-7.
Figure 10:
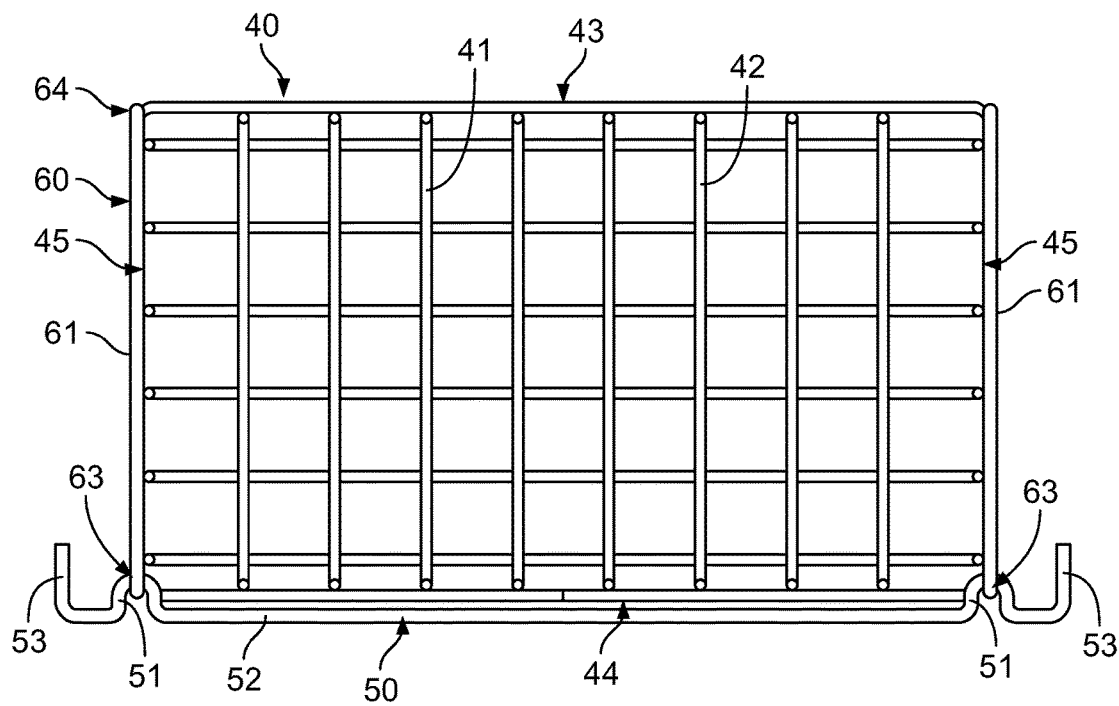
FIG. 10 is a top view of the retractable tray of FIGS. 2-7.
Figure 11:
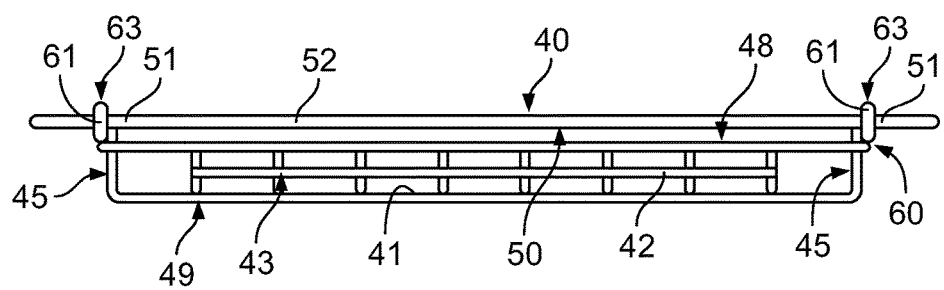
FIG. 11 is a front view of the retractable tray of FIGS. 2-7.

The tray member 42 is moveable between the extended position, an example of which is shown in FIGS. 4-5, and 7, and the retracted position, an example of which is shown in FIGS. 2-3 and 6. In the extended position, the tray member 42 extends outwardly into the chamber 21 of the basket 20, such that the supporting surface 41 is generally horizontal and configured to support an article above a floor 23 of the basket 20. In the retracted position, the tray member 42 is oriented in a generally vertical position so that the tray member 42 does not extend a significant distance into the chamber 21, generally extending the least distance possible from the wall of the basket 20 considering structural limitations. When the tray member 42 in the embodiment illustrated in FIGS. 2-7 is in the extended position, the tray member 42 has the first end 43 positioned adjacent the front wall 20 and the second end 44 extended outwardly from the front wall 22 and into the basket 20. The mounts 51 are located at the first ends 63 of the tracks 61 in the extended position, and the tray member 42 is restrained against pivoting farther toward the floor 23 by the side wall 46 of the tray member 42 at the first end 43 abutting the front wall 22 of the basket 20. In one embodiment, the side wall 46 at the first end 43 may be considered to form a heel 43A that abuts the inner surface of the front wall 26 of the basket 20 to prevent the tray member 42 from pivoting further downward, as shown in FIGS. 7 and 9. When the tray member 42 in the embodiment illustrated in FIGS. 2-7 is in the retracted position, the tray member 42 is positioned so that both the first end 43 and the second end 44 of the tray member 42 are positioned adjacent the front wall 22 and the supporting surface 41 extends along the front wall 22, such that the supporting surface 41 is generally in a vertical orientation. The mounts 51 are located at the second ends 64 of the tracks 61 in the retracted position, and the tray member 42 hangs from the mounts 51. In this position, the top side 48 of the tray member 42 faces the front wall 22 of the basket 20, and the underside 49 faces into the chamber 21 of the basket 20.

In the embodiment illustrated in FIGS. 2-12, the tray member 42 moves from the extended position and the retracted position by first pivoting the second end 44 of the tray member 42 upward and toward the front wall 20, as shown schematically by arrow A in FIG. 4. The top surface 48 of the tray member 42 faces the front wall 22 of the basket 20 in this position. This position can be considered an intermediate or partially retracted position, and the mounts 51 are still located at or near the first ends 63 of the tracks 61 in this intermediate position. After the tray member 42 is pivoted upward, the tray member 42 can slide downward along the front wall 22 from the intermediate position to the fully retracted position, as also shown schematically by arrow B in FIG. 4. When the tray member 42 reaches the intermediate position, the tracks 61 are positioned vertically, and the tray member 42 can slide downward by the tracks 61 sliding relative to the mounts 51 such that the mounts 51 traverse from the first ends 63 to the second ends 64 of the tracks 61. The tray member 42 in the embodiment of FIGS. 2-12 can move from the retracted position back to the extended position in the reverse order described above and shown in FIG. 4, i.e., by sliding upward and then pivoting the second end 44 of the tray member 42 downward and away from the front wall 20. It is understood that the tray member 42 in this embodiment passes through the intermediate position during this action, and that the tracks 61 slide relative to the mounts 51 such that the mounts 51 traverse from the second ends 64 to the first ends 63 of the tracks 61 during this motion. In other embodiments, movement between the extended to the retracted position may be different, depending on the structures of the relevant components. In one embodiment, the tray 40 may be moveable between the extended and retracted positions by pivoting only, without sliding.

In the embodiment illustrated in FIGS. 2-12, the tray 40 does not interfere with nesting of the cart 10 with other carts 11 when in the extended position or the retracted position, as illustrated in FIG. 12. As described above, the cart 10 has a nesting stop 13 that is created by engagement of two abutting structures 13a, 13b located on the chassis portion 14 of the cart 10, and the positions of these two abutting structures 13a, 13b define the nesting distance D. When the cart 10 is nested with a second cart 11, the nesting distance D creates a free space 47 within the basket 20 of the cart 10 (adjacent the front wall 22) where no portion of the second cart 11 is located. In order to not interfere with nesting, the dimensions of the tray 40 are such that the tray 40 is positioned entirely within this free space 47, or in other words, the tray member 42 does not extend farther into the basket 20 than the nesting distance D. Generally, the nesting distance D will be approximately equal to the distance between the abutment surfaces of the two abutting structures 13a, 13b on the cart 10. Therefore, the length of the tray member 42, measured between the first and second ends 43, 44, is smaller than the distance between the two abutting structures 13a, 13b on the cart 10, so that the tray 40 will not interfere with nesting even in the extended position. In one embodiment, the nesting distance is approximately 9 inches, and the tray member 42 in this embodiment has a length that is less than 9 inches, i.e., approximately 8.875 inches or between 8.5 and 9 inches. A tray member 42 configured with these dimensions is usable with carts 10 having a nesting distance of 9 inches or greater. It is understood that when used with carts 10 having different nesting distances, the dimensions of the tray 40 may be adjusted accordingly.

The tray member 42 may also have a height (measured along the side walls 46) that is relatively small, in order to not take up excessive space in the basket 20 when in the retracted position. In one embodiment, the height of the tray member 42 and the tracks 61 combined is approximately 2 inches.

FIGS. 13-16 illustrate additional embodiments of a retractable tray 40 according to aspects of the disclosure. These embodiments have many components and features in common with the embodiment illustrated in FIGS. 2-12 and described herein, and the same reference numbers will be used to reference such common structures in FIGS. 13-16. For example, the embodiments of FIGS. 13-16 use a tray member 42 and a connecting structure 60 that are similar or identical to the tray member 42 and the connecting structure 60 in FIGS. 2-12. The retractable trays 40 in the embodiments of FIGS. 13-16 differ from the embodiment of FIGS. 2-12 in the configuration of the mounting structures 50. Components and features that have already been described above with respect to FIGS. 2-12 will not be described again herein with respect to FIGS. 13-16 for the sake of brevity. It is understood that the embodiments of FIGS. 13-16 may include any components or features, or variations thereof, described herein with respect to FIGS. 2-12, and vice versa.

Figure 13:
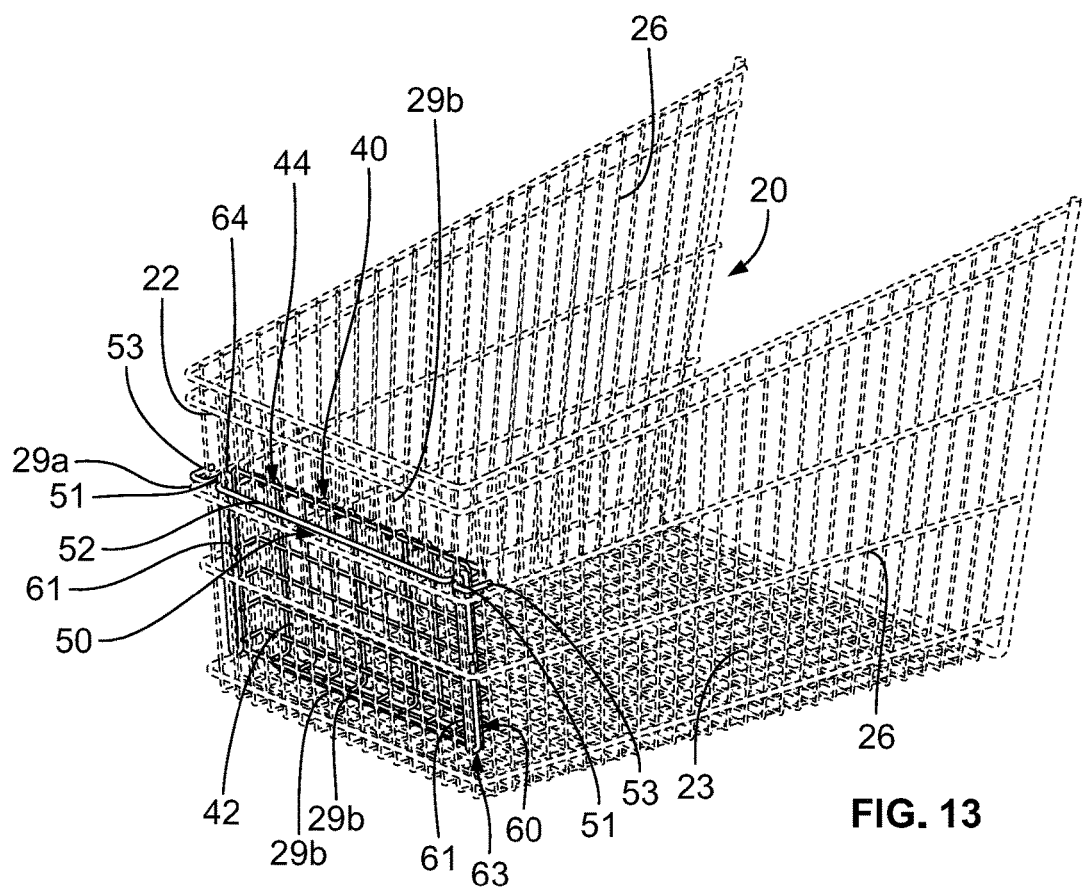
FIG. 13 is a perspective view of a basket of a shopping cart including another embodiment of a retractable tray according to aspects of the present disclosure, with the retractable tray shown in a retracted position.
Figure 14:
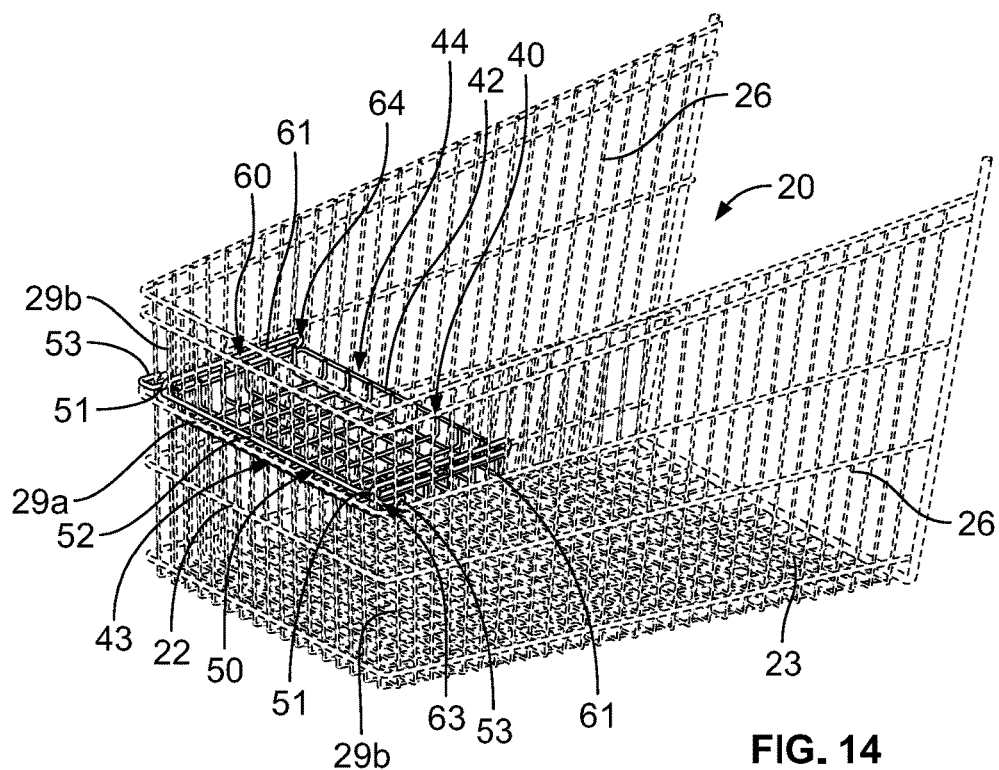
FIG. 14 is a perspective view of the basket of the shopping cart including the retractable tray of FIG. 13, with the retractable tray shown in an extended position.

The embodiment of FIGS. 13-14 uses a mounting structure 50 that is similar or identical in form and structure to the mounting structure 50 of the embodiment of FIGS. 2-12, but the mounting structure 50 in FIGS. 13-14 is positioned differently than in the embodiment of FIGS. 2-12. In the embodiment of FIGS. 13-14, the mounting member 52 is not abutting or located immediately adjacent to any of the horizontal wires 29 of the basket 20, and the mounting member 52 is connected only to the vertical wires 29b. As seen in FIGS. 13-14, the mounting member 52 is spaced from the nearest horizontal wire 29a. The mounting member 52 in this configuration is connected at several points to vertical wires 29b along the front wall 22 of the basket 20, and the reinforcing members 53 are connected to vertical wires 29b at the corners and/or along the sides 26 of the basket 20, e.g., by welding or other connection technique. The retractable tray 40 in FIGS. 13-14 operates and functions in moving between the extended and retracted positions in the same manner as the retractable tray 40 in FIGS. 2-12, as described elsewhere herein.

The embodiment of FIGS. 15-16 includes the same retractable tray 40 as shown in FIG. 1, and uses a mounting structure 50 that includes two separate brackets or shackles 54 that form the mounts 51. The brackets 54 may each be formed of a bent wire in the embodiment of FIGS. 15-16. Each of the brackets 54 has a mounting portion 55 that is fixedly connected to the basket 20, with a mount 51 connected to the mounting portion 55 and configured for moveable connection to the connecting structure 60. As most clearly shown in FIG. 16, the mounting portion 55 has a U-shape or C-shape and curves around one of the horizontal wires 29a on the exterior side of the front wall 22 of the basket 20, and the mounting portion 55 of each bracket 54 may be welded to the wire 29a in multiple locations in one embodiment. The mount 51 also has a U-shape configuration and extends into the basket 20 between two of the vertical wires 29b in the embodiment of FIGS. 15-16 to connect to the connecting structure 60, similarly to the embodiment of FIGS. 2-12 described herein. In other embodiments, the mounting portion 55 of each bracket 54 may have additional retaining structure. The retractable tray 40 in FIGS. 15-16 operates and functions in moving between the extended and retracted positions in the same manner as the retractable tray 40 in FIGS. 2-12, as described elsewhere herein.

Additional aspects of the disclosure relate to a method of modifying a shopping cart 10 by mounting a tray 40 as described herein on the shopping cart 10. Such a method may include providing the shopping cart 10 and/or the retractable tray 40, connecting the mounting structure 50 to the shopping cart 10, and mounting the tray member 42 on the mounting structure 50 by connecting the connecting structure 60 to the mounting structure 50. The mounting structure 50 may be connected to the cart 10 by welding or other techniques as described herein.

The various embodiments described herein, including retractable trays and shopping carts outfitted with such trays, provide benefits and advantages over existing technologies. For example, such trays can be manufactured in an efficient and cost-effective manner by use of wires, including wires that are the same or similar to the wires used in manufacturing the basket of the shopping cart. As another example, trays as described herein can be easily and quickly mounted on a shopping cart. As a further example, trays as described herein can be easily operated by customers and do not occupy significant space within the shopping cart basket when in the retracted position. As yet another example, trays as described herein that have a width smaller than the nesting distance between the carts will not interfere with nesting of the carts if the tray is inadvertently left in the extended position. Still further benefits and advantages are provided, which are recognizable to those skilled in the art.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A retractable tray comprising:
    a tray member including a supporting surface and having a first end and a second end opposite the first end;
    a mounting structure configured to be connected to a wall of a shopping cart basket; and
    a connecting structure connected to the tray member and moveably connected to the mounting structure such that the tray member can move between an extended position, where the first end of the tray member is positioned adjacent the mounting structure and configured to be positioned adjacent the wall of the shopping cart basket and the second end of the tray member is extended outwardly from the mounting structure and configured to extend into the shopping cart basket, such that the supporting surface is configured to support an article above a floor of the shopping cart basket, and a retracted position, where the tray member is positioned so that both the first end and the second end of the tray member are configured to be positioned adjacent the wall of the shopping cart basket, and the supporting surface is configured to extend along the wall,
    wherein the mounting structure comprises a first mount and a second mount spaced horizontally from each other, and the connecting structure comprises first and second connecting members connected to the tray member, wherein the first connecting member moveably engaged with the first mount and the second connecting member is moveably engaged with the second mount,
    wherein the mounting structure further comprises a mounting member that forms the first and second mounts and extends between the first and second mounts, wherein the mounting member is configured for connection to the wall of the shopping cart basket, and
    wherein the mounting member is formed of a single piece of metal wire configured to extend horizontally along the wall of the shopping cart basket, the metal wire having first and second projections that are configured to extend inwardly into the shopping cart basket to form the first and second mounts.

2. The retractable tray of claim 1, wherein the connecting structure comprises a first elongated track and a second elongated track, wherein the first mount is engaged with the first elongated track and the second mount is engaged with the second elongated track, such that the first and second tracks are configured to slide with respect to the first and second mounts in moving the tray member between the extended position and the retracted position.

3. The retractable tray of claim 2, wherein the first and second elongated tracks each include an elongated passage, wherein portions of the first and second mounts are received within the elongated passages of the first and second elongated tracks, and the portions of the first and second mounts are configured to slide within the elongated passages in moving the tray member between the extended position and the retracted position.

4. The retractable tray of claim 2, wherein the mounting structure and the connecting structure are configured such that the tray member is moveable from the extended position to the retracted position by pivoting the second end upward and toward the mounting structure from the extended position to reach a partially-retracted position, and then moving the tray member downward from the partially-retracted position while sliding the first and second elongated tracks downward with respect to the first and second mounts to reach the retracted position.

5. The retractable tray of claim 1, wherein the tray member, the mounting structure, and the connecting structure are all formed of metal wire, wherein the connecting structure is welded to the tray member and the mounting structure is configured to be welded to the wall of the shopping cart basket.

6. A shopping cart assembly comprising:
a shopping cart comprising a basket having a plurality of walls defining a chamber, a frame supporting the basket, and casters connected to the frame, the plurality of walls of the basket including a front wall at a front of the shopping cart; and
a retractable tray connected to the basket of the shopping cart, the retractable tray comprising:
  a tray member including a supporting surface and having a first end and a second end opposite the first end;
  a mounting structure connected to the front wall of the basket; and
  a connecting structure connected to the tray member and moveably connected to the mounting structure such that the tray member can move between an extended position, where the first end of the tray member is positioned adjacent the mounting structure and the front wall of the basket and the second end of the tray member is extended outwardly from the mounting structure and into the chamber of the basket, such that the supporting surface is configured to support an article above a floor of the basket, and a retracted position, where the tray member is positioned so that both the first end and the second end of the tray member are positioned adjacent the front wall, and the supporting surface is configured to extend along the front wall,
  wherein the mounting structure comprises a first mount and a second mount spaced horizontally from each other, and the connecting structure comprises first and second connecting members connected to the tray member, wherein the first connecting member moveably engaged with the first mount and the second connecting member is moveably engaged with the second mount,
  wherein the mounting structure further comprises a mounting member that forms the first and second mounts and extends between the first and second mounts, wherein the mounting member is connected to the front wall of the basket and extends horizontally along the front wall, and
  wherein the mounting member is formed of a single piece of metal wire extending horizontally along an outside of the front wall of the basket, the metal wire having first and second projections that extend inwardly into the basket to form the first and second mounts.

7. The shopping cart assembly of claim 6, wherein the connecting structure comprises a first elongated track and a second elongated track, wherein the first mount is engaged with the first elongated track and the second mount is engaged with the second elongated track, such that the first and second tracks are configured to slide with respect to the first and second mounts in moving the tray member between the extended position and the retracted position.

8. The shopping cart assembly of claim 7, wherein the first and second elongated tracks each include an elongated passage, wherein portions of the first and second mounts are received within the elongated passages of the first and second elongated tracks and are configured to slide within the elongated passages in moving the tray member between the extended position and the retracted position.

9. The shopping cart assembly of claim 7, wherein the mounting structure and the connecting structure are configured such that the tray member is moveable from the extended position to the retracted position by pivoting the second end upward and toward the mounting structure and the front wall of the basket from the extended position to reach a partially-retracted position, and then moving the tray member downward along the front wall from the partially-retracted position while sliding the first and second elongated tracks downward with respect to the first and second mounts to reach the retracted position.

10. The shopping cart assembly of claim 6, wherein the tray member, the mounting structure, and the connecting structure are all formed of metal wire, wherein the connecting structure is welded to the tray member and the mounting structure is welded to the front wall of the basket.

11. The shopping cart assembly of claim 6, wherein the tray member is positioned within the chamber of the basket in the extended position and the retracted position.

12. The shopping cart assembly of claim 6, wherein the shopping cart has a nesting stop configured for abutting a structure on a second identical cart when nested with the second identical cart, wherein the nesting stop defines a nesting distance between the shopping cart and the second identical cart when nested, and the tray has a length defined between the first and second ends that is smaller than the nesting distance.

13. A retractable tray comprising:
a tray member including a supporting surface and having a first end and a second end opposite the first end and two sides extending between the first and second ends;
a mounting structure configured to be connected to a wall of a shopping cart basket, the mounting structure comprising two mounts spaced from each other; and
a connecting structure comprising two elongated tracks connected to the sides of the tray member and extending along the sides, each of the tracks having a proximal end located proximate the first end of the tray member and a distal end located proximate the second end of the tray member, with a length defined between the proximal and distal ends, wherein each of the elongated tracks is moveably connected to one of the mounts of the mounting structure such that the tray member is moveable by the elongated tracks sliding with respect to the mounts,
wherein the tray member is configured to be moveable between an extended position, where the first end of the tray member is positioned adjacent the mounting structure and configured to be positioned adjacent the wall of the shopping cart basket and the second end of the tray member is extended horizontally outwardly from the mounts and configured to extend into the shopping cart basket, such that the supporting surface is configured to support an article above a floor of the shopping cart basket, and a retracted position, where the tray member is positioned so that both the first end and the second end of the tray member are configured to be positioned adjacent the wall of the shopping cart basket, and the supporting surface is configured to extend vertically along the wall, and wherein the connecting structure is configured such that the mounts traverse the length of each of the elongated tracks in moving between the extended position and the retracted position, wherein the mounts are located at the proximal ends of the tracks in the extended position and the mounts are located at the distal ends of the tracks in the retracted position, wherein the mounting structure further comprises a mounting member that forms the mounts and extends between the mounts, wherein the mounting member is configured for connection to the wall of the shopping cart basket, and wherein the mounting member is formed of a single piece of metal wire configured to extend horizontally along the wall of the shopping cart basket, the metal wire having two projections that are configured to extend inwardly into the shopping cart basket to form the mounts.

14. The retractable tray of claim 13, wherein the elongated tracks each include an elongated passage extending from the proximal end to the distal end, wherein a portion of each of the mounts is received within the elongated passage of each of the elongated tracks and is configured to slide within the elongated passages in moving the tray member between the extended position and the retracted position.

15. The retractable tray of claim 13, wherein the mounting structure and the connecting structure are configured such that the tray member is moveable from the extended position to the retracted position by pivoting the second end upward and toward the mounting structure from the extended position to reach a partially-retracted position, and then moving the tray member downward from the partially-retracted position while sliding the elongated tracks downward with respect to the mounts to reach the retracted position.

16. The retractable tray of claim 13, wherein the tray member, the mounting structure, and the connecting structure are all formed of metal wire, wherein the elongated tracks are welded to the sides of the tray member and the mounts are configured to be welded to the wall of the shopping cart basket.

* * * * *